March 8, 1966 W. ANTRITTER 3,239,700
BIASING SPRING, PARTICULARLY FOR AN EDDY CURRENT COUPLING
Filed Nov. 6, 1962 3 Sheets-Sheet 1
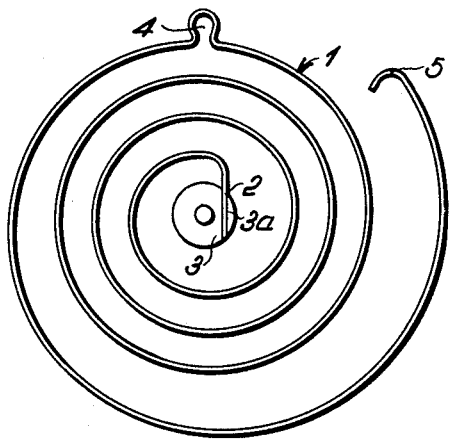
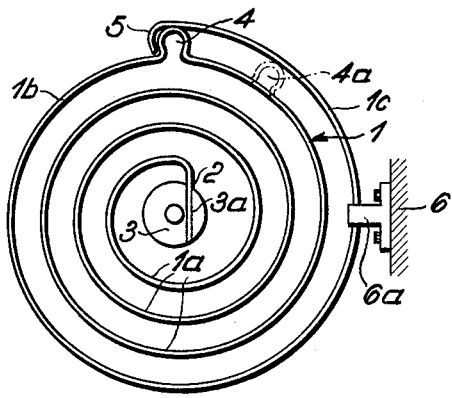
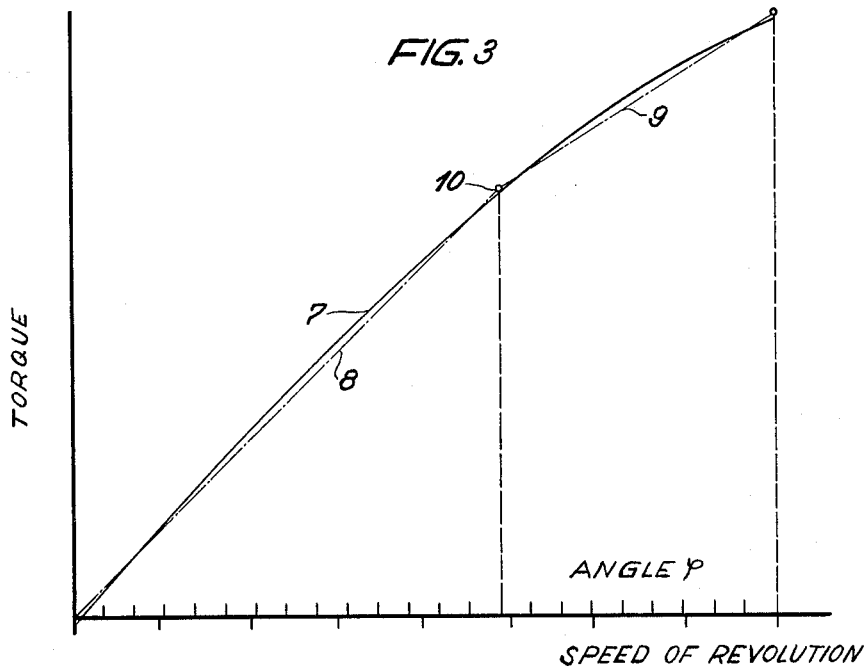
INVENTOR
Werner Antritter
by Michael S. Striker March 8, 1966     W. ANTRITTER     3,239,700
BIASING SPRING, PARTICULARLY FOR AN EDDY CURRENT COUPLING
Filed Nov. 6, 1962     3 Sheets-Sheet 2
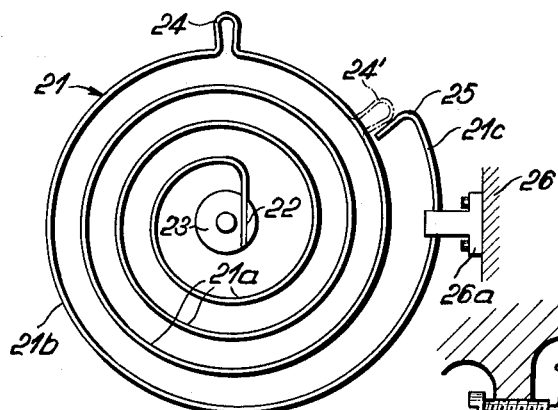
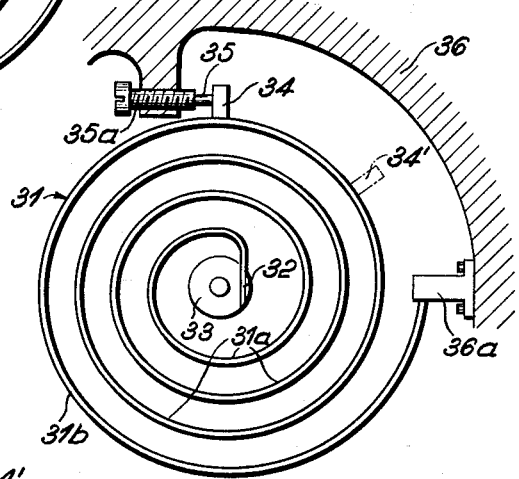
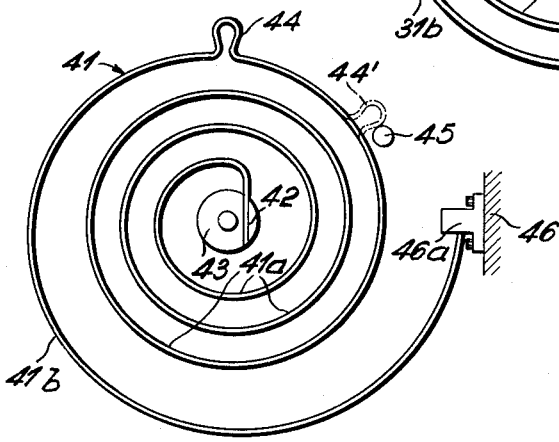
INVENTOR
Werner Antritter
by Michael S. Striker March 8, 1966  W. ANTRITTER  3,239,700

BIASING SPRING, PARTICULARLY FOR AN EDDY CURRENT COUPLING

Filed Nov. 6, 1962  3 Sheets-Sheet 3

INVENTOR
Werner Antritter
by Michael S. Striker

United States Patent Office 3,239,700
Patented Mar. 8, 1966

3,239,700
BIASING SPRING, PARTICULARLY FOR AN EDDY CURRENT COUPLING
Werner Autritter, Villingen, Black Forest, Germany, assignor to Kienzle Apparate G.m.b.H., Villingen, Black Forest, Germany
Filed Nov. 6, 1962, Ser. No. 235,710
Claims priority, application Germany, Nov. 7, 1961, K 45,140
17 Claims. (Cl. 310—97)

This invention relates to a spring arrangement for a measuring system, and more particularly to the arrangement of a spirally coiled torsion spring in an electrical speed measuring or recording apparatus operating with the aid of eddy currents.

In apparatus of the above type such as devices for measuring the speed of revolution, tachometers, tachographs and the like, a torque is normally produced which is related to the value to be measured, e.g., to the number of revolutions per unit of time. Such torque may not have an entirely linear characteristic when considered as a function of the value to be determined. This is true in particular if the torque is produced by eddy currents and the measurements extend over a relatively wide range. If the torque does not follow a linear course, the graduation of the measuring system likewise will not be linear.

A graph representing the torque or an equivalent impulse as a function of the value to be measured will here be referred to as the system characteristic. Frequently, such graph tends to flatten out in the region of higher values, particularly in the case of measuring systems utilizing the eddy current principle. On the other hand, conventional measuring apparatus comprise a spring such as a spirally coiled torsion spring to provide the necessary restoring torque. Since springs normally have linear characteristics throughout their entire range of operation, a precise calibration of a measuring apparatus having a non-linear system characteristic is very difficult to accomplish if it is possible at all.

Another problem is encounted when it is desired to use a differential dial indicating a selected range of measurement on an enlarged scale. For example, speed measuring instruments for trolley cars and other vehicles for short distance traffic should preferably be arranged so that a predetermined lower range of speeds is shown on a portion of the dial larger than that coordinated to a corresponding higher range of speeds. Thus, a more precise indication or a more easily readable graduation is obtained in the range wherein the vehicle is most frequently used. Such differential graduation cannot be achieved with a spring having a uniform linear characteristic throughout. Prior arrangements used to obtain differential graduations have not been fully satisfactory.

It is an object of the invention to provide an improved measuring system in which the foregoing difficulties are minimized or avoided in a simple and effective manner.

It is also an object of the invention to adapt the characteristics of a spring of a measuring system to the instant measurement to be taken.

It is another object of the invention to vary the characteristics of a spring of a measuring system having a non-linear characteristic in a manner such that the interaction of the characteristics of the spring and system will produce a resulting characteristic which is substantially in conformity with a desired type of graduation, e.g., a uniform graduation.

It is an additional object of the invention to vary the characteristics of a spring of a measuring system having a non-linear characteristic in a manner such that the graduation of the system will be approximately linear.

It is a further object of the invention to vary the characteristics of a spring of a measuring system having a non-linear characteristic in a manner such that a rotatable indicator will, in the entire range of measurement, be turned through a substantially equal angular increment per unit of the value to be determined.

It is a still further object of the invention to vary the characteristics of a spring of a measuring system in a manner such that the graduation will be differential and the indicating scale will differ in predetermined ranges of measurement in a desired manner.

With these and other objects in view, the invention includes the provision of an improved measuring system for determining values in consecutive ranges of magnitude. The system comprises a resiliently flexible spring which in response to the magnitude of the values to be determined is deformable through consecutive ranges of deflection and stress coordinated to the ranges of magnitude of the aforesaid values. The characteristics of the spring will depend upon the effective length thereof, and means are provided for varying the effective length of the spring in accordance with the instant range of deflection and stress thereof, whereby the instant characteristics of the spring are adaptable to the range of magnitude within which a respective value is measured.

Another aspect of the invention resides in an improved measuring system or apparatus for determining values in different ranges of magnitude under different conditions. The system or apparatus comprises a resiliently flexible, spirally coiled torsion spring capable when flexed of developing torque proportional to the effective length thereof and arranged to be twisted through torsion angles related to the magnitude of the values to be determined, the torsion angles extending through different ranges coordinated to the ranges of magnitude of the aforesaid values. Means are provided for varying the effective length of the spring in accordance with the range of the instant torsion angle through which the spring is twisted, whereby the torque developed by the spring per unit of torsion angle is adaptable to the conditions in the instant range of magnitude within which the instant measurement is taken.

A further aspect of the invention resides in an improved measuring system comprising a resilient spring deflectable in response to the magnitude of the values to be determined and having characteristics depending upon the length of the spring, and means for varying the effective length of the spring in accordance with the instant range of magnitude in which a respective measurement is taken, whereby the characteristics of the spring are adaptable to the conditions prevailing in different ranges of magnitude of the values to be determined.

To adapt the characteristics of the spring to the system characteristic when eddy currents are used, the effective length of the spring should be increased in the range of larger measurements. In the case of a spirally coiled spring, this may be accomplished by prestressing the outermost winding of the spring in the zero position of the instrument and at the same time rendering it ineffective with the aid of abutment means until the stress in the remaining windings is equal to that in the prestressed outermost winding, whereupon the latter will automatically be added to the operative spring portion to increase the effective length of the spring.

If, on the other hand, a differential graduation is desirable with a portion thereof being expanded in the lower range of measurements to indicate lower value more precisely or more clearly, it is necessary to vary the spring characteristics so that the effective length of the spring is greatest in the low measurement range and decreases when a higher range is reached. This may be accomplished by using the entire operative length of the spring in the lower range of measurements and then rendering a predetermined portion of the spring ineffective when the lower measurement range is exceeded. For this purpose, one embodiment of the invention includes a lever which is mounted on a turnable member of the measuring system so as to be freely rotatable thereon, and which after rotation through a predetermined angle engages a stationary stop. It should be note, however, that such lever could also be arranged for adapting the spring characteristics to the system characteristic.

When changing the effective length of the spring, care should be taken to prevent buckling as well as excessive deflection of the spring. The individual windings of a spirally coiled spring should not be caused to contact each other. When abutment means such as a projection, lever or stop act upon a winding of a spirally coiled spring, the resulting force should preferably be disposed tangentially of the respective winding.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic elevational view of a spiral spring connected at one end to a turnable member, but otherwise unconfined;

FIG. 2 is a schematic elevational view of the spring of FIG. 1 with both ends mounted in a measuring apparatus, the parts being shown in solid lines in the zero position;

FIG. 3 is a diagram showing the characteristics of the measuring system and of the spring of FIG. 2;

FIGS. 4, 5 and 6 are schematic elevational views of modified arrangements;

Figure 10:
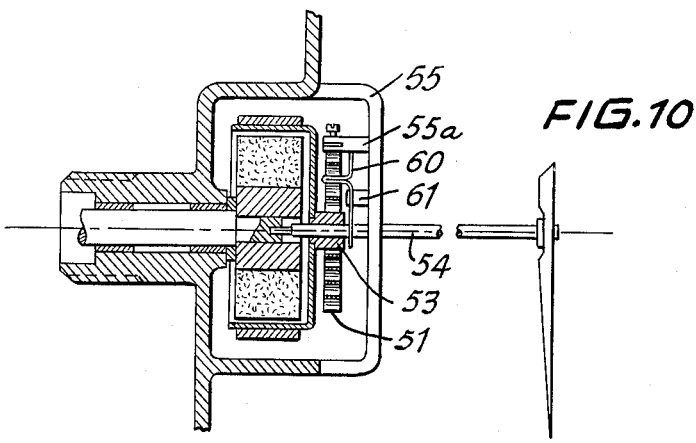
FIG. 10 is a sectional view of a measuring apparatus embodying a spring arrangement according to my present invention.

Referring now to the drawings in greater detail, FIG. 1 shows a spirally coiled torsion spring generally indicated at 1, the inner end 2 of which is connected to a turnable member of shaft 3 of a measuring apparatus or instrument by holding means including a slot 3a or the like in the shaft, the parts being aligned in a manner such that the axis of shaft 3 passes precisely through the center of spring 1. The measuring apparatus in general may be as shown in FIG. 10 of the type disclosed in my co-pending application Ser. No. 72,389, filed Nov. 29, 1960 for Electrical Speed Measuring and Recording Devices.

In the present instrument, abutment means are provided comprising an external projection in the form of a folded portion or loop 4 on the outermost winding of spring 1, and an inwardly bent portion or hook 5 at the free end of the outermost winding. FIG. 1 shows the spring before the outermost winding thereof is attached to the apparatus and thus illustrates the shape of spring 1 in its unconfined condition with the outermost winding flaring outwardly away from the center of the spring.

The housing of the apparatus is schematically indicated at 6 in FIG. 2. Before the spring is attached to the housing, the hook 5 thereof is positioned behind the loop 4 to engage the latter as shown in FIG. 2. The outermost winding extending from loop 4 to hook 5 is now concentric with regard to the middle of the spring and is prestressed to a predetermined degree. Fastening means schematically indicated at 6a serve for securing the spring to the housing 6. The exact angular position of the fastening means 6a relative to the loop 4 and hook 5 depends partly upon the number of windings of the spring and partly upon the desired spring characteristics.

The part 1a of spring 1 extending from shaft 3 to loop 4 is an inner continuously effective or main effective portion, and the part 1b extending from loop 4 to the fastening means 6a is an outer addible or auxiliary effective portion, whereas the part 1c projecting from the fastening means 6a and carrying the hook 5 thereon is a terminal extension forming an abutment or stop, all of which will be apparent as the description proceeds.

FIG. 3 shows a diagram wherein the abscissas represent the speed of revolution to be measured, e.g., the speed of a rotating wheel or shaft, in one graduation, but the torsion angle or winding angle or angle of twist $\varphi$ of the spring in another graduation, while the ordinates represent torque. Curve 7 shows the torque produced by eddy currents operatively derived from the rotating wheel or shaft to be observed, the torque being indicated as a function of the speed of revolution. This curve may be called the characteristic of the system and it should be noted that curve 7 becomes flatter as the speed of revolution increases. The restoring torque produced by the torsion spring of FIG. 2 upon deflection (twisting) thereof is indicated by lines 8 and 9 as a function of the torsion angle or winding angle $\varphi$, i.e., the angle through which the inner end 2 of the spring is turned or twisted relative to the other end thereof. It will be clear that this angle is the same as that through which the shaft 3 is turned. The intersection of lines 8 and 9, i.e., the point of change, is indicated at 10 in the diagram. It will also be apparent that line 8 follows a steeper course than line 9. This variation in the spring characteristics is achieved in the following manner.

The zero position of the parts is indicated in solid lines in FIG. 2. During the measuring operation, shaft 3 is clockwise rotated due to the action of eddy currents, the angle of rotation being related to the speed of revolution to be measured. The torque produced by the eddy currents and acting on shaft 3 is opposed by the restoring torque developed by spring 1. At the start of the operation, the restoring torque corresponds to line 8 of the diagram and is produced alone by the main effective portion 1a of the spring which extends from the inner end 2 to the loop 4. At this time, the auxiliary effective portion 1b of the spring extending from loop 4 to the fastening means 6a is prestressed as this auxiliary effective portion is a part of the initially prestressed outermost winding. During this stage of the operation, loop 4 has the effect of a fixed support or abutment and the effective length of the spring is limited since the auxiliary portion 1b of the spring is inoperative so that the spring constant $Ts/\varphi$ is relatively large at this time, Ts being the restoring torque developed by the spring and $\varphi$ being the torsion angle or winding angle through which one end of the spring is turned relative to the other end thereof when shaft 3 turns. The deflection or deformation of the spring is proportional to the winding angle.

The inner or main effective portion 1a of the spring is stressed while shaft 3 rotates. When a predetermined winding angle has been reached corresponding to a certain value measured as indicated by the abscissa of point 10 in the diagram, the stress in the inner or main effective portion 1a will be equal to that prevailing in the initially prestressed outer or auxiliary effective portion 1b and upon continued rotation of shaft 3, the loop 4 will be moved away from hook 5 in clockwise direction as shown in phantom at 4a in FIG. 2. Thereby, the outer or auxiliary effective portion 1b of the spring is likewise rendered operative and the length thereof is added to the length of the main effective portion 1a so that in the range of higher measurements beyond the point of change at 10 in the diagram both portions 1a and 1b cooperate with each other. The increased effective length of the spring results in a reduced inclination of the graph representing the characteristics of the spring as indicated by line 9 in the diagram and in this manner the characteristics of the spring are adapted to the relatively flat pattern of the system curve 7 in the higher range of measurement. In other words, the spring is relatively stiff in the lower range of measurements, but softer in the consecutive higher range to conform to the system characteristic.

It will be clear that the improved arrangement renders it possible to adapt the system characteristic and the spring characteristics to each other stepwise in predetermined ranges of measurement. The effective length of the spring is automatically varied when the winding angle and thus the deflection and stress of the spring exceed a predetermined range corresponding to a certain range of magnitude of the values to be measured.

It should also be noted that the abutment means 4, 5 limit the deflection or winding of the spring in one direction only, and that the resulting force produced by the action of the abutment means is tangentially directed with respect to the circumference of the spring.

FIG. 4 illustrates a modification in which a spring of variable effective length is utilized to obtain a differential graduation having relatively widely spaced markings in a lower range of measurements but narrower markings in a consecutive higher range. For this purpose, the graph representing the spring characteristics should ascend only in a limited manner in the lower range and should have a greater inclination in the consecutive higher range so that the course will be steeper there, instead of showing a tendency to flatten out. This may be accomplished by mounting a spiral spring without imparting any initial stress to the windings thereof. The spring generally indicated at 21 in FIG. 4, which is substantially identical with the unconfined spring of FIG. 1, is mounted without stressing its windings and includes an inner end portion 22 attached to shaft 23 of the system, a loop 24, and a hook 25 at the end of an extension 21c. A fastening means 26a is arranged to secure the spring 21 to housing 26 without changing the shape which the spring assumes when unconfined.

At the start of a measuring cycle, the total effective length of spring 21 extending from the inner end 22 thereof to the fastening means 26a is operative, the spring being relatively soft at this time and the coordinated markings of the graduation being spaced relatively widely. Upon clockwise rotation of shaft 23, the spring will be gradually wound up and tightened and when loop 24 engages the outer face of hook 25 as shown in phantom at 24', the auxiliary effective portion 21b of the spring extending from loop 24 to the fastening means 26a will be made inoperative. Only the inner portion 21a extending from the inner end 22 to the loop 24 of the spring will now be effective, which will result in a steeper characteristic, that is, the spring will now be stiffer and the graduation will became narrower in this range in the desired manner. Generally, the characteristics of spring 21 are of the type shown in the diagram of FIG. 9 which will be described later.

FIG. 5 illustrates an embodiment which is similar to the apparatus of FIGS. 1 to 3 in certain respects and serves for the same purpose, that is, for the adaptation of the spring characteristics to the system characteristic, but the structure has been modified in that the loop 4 and the extension 1c carrying the hook 5 of the spring of FIGS. 1 and 2 have been replaced by alternative means. As shown in FIG. 5, a spring generally indicated at 31 which has an inner end 32 attached to shaft 33 of the system, is provided with a rider 34 secured to the spring as to form an external projection thereof. To replace the extension 1c and hook 5 of FIGS. 1 and 2, a stop 35 is attached to a housing 36 which also carries fastening means 36a for the spring. Stop 35 which may be adjustable as indicated at 35a is positioned so that when spring 31 is mounted with the rider 34 engaging the stop 35, the auxiliary effective portion 31b extending from the rider 34 to the fastening means 36a will be prestressed and initially only the main effective portion 31a extending from shaft 33 to rider 34 will be operative. After shaft 33 has turned in clockwise direction through a predetermined angle, the stress produced in the main effective portion 31a will reach that prevailing in the prestressed auxiliary portion 31b. Rider 34 will move away from stop 35 as indicated in phantom at 34' and both portions 31a and 31b will then be operative. The characteristics of spring 31 are generally of the type shown in the diagram of FIG. 3, that is, the spring is initially relatively stiff but is softer in a higher range of measurements. Thus, the spring is adapted for use in a measuring system, the characteristic of which has the tendency to flatten out when the magnitude of the values to be measured exceeds a certain limit.

FIG. 6 illustrates an embodiment in which the arrangement of FIG. 5 has been modified to serve for providing a differential graduation having differently spaced markings in selected ranges of measurement. A spring generally indicated at 41 which has an inner end 42 attached to shaft 43 of the system is provided with a loop 44, but instead thereof a rider as shown in FIG. 5 may be used if desired. A stop or pin 45 which may be fixed as shown or may be adjustable is attached to a housing 46 which also carries fastening means 46a for the spring. Similar to FIG. 4, the loop 44, stop 45, and fastening means 46a are arranged so that the windings of spring 41 are free of stress when initially mounted in the apparatus. At the start of the operation, both portions 41a and 41b of the spring are operative. Upon clockwise rotation of shaft 43, the spring is gradually wound up and tightened and when loop 44 engages the stop 45 as shown in phantom at 44', the auxiliary effective portion 41b of the spring will be rendered inoperative. Thus, this embodiment operates in a manner similar to that explained in connection with FIG. 4, the characteristics of the spring being of the type illustrated in FIG. 9 which will be described later. These spring characteristics render it possible to provide a differential graduation arranged in the desired manner.

Figure 7:
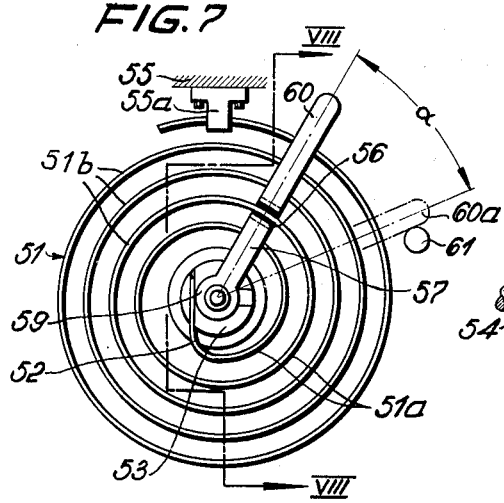
FIG. 7 is a schematic elevational view of a further modification and illustrates the zero position in solid lines.
Figure 8:
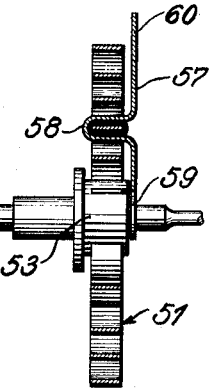
FIG. 8 is a section taken along line VIII—VIII of FIG. 7.
Figure 9:
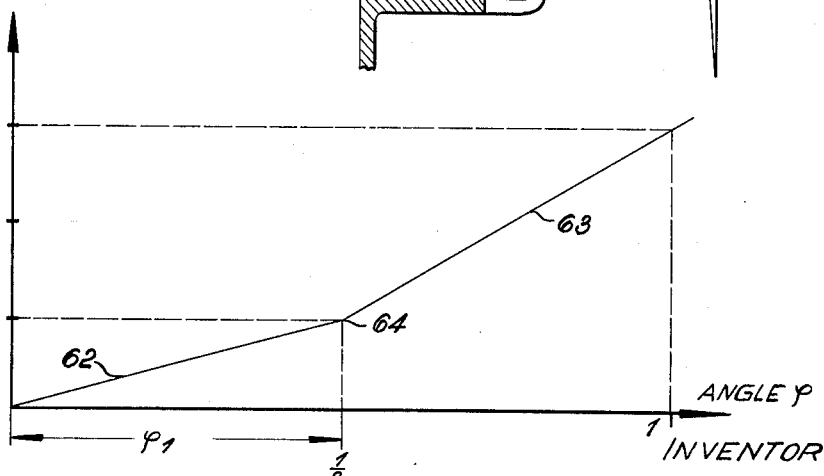
FIG. 9 is a diagram indicating the characteristics of the spring of FIGS. 7 and 8.

Referring now to the embodiment of FIGS. 7 to 9, the same is shown as arranged for the purpose of obtaining a differential graduation, but it could also be modified to serve for adapting the spring characteristics to the system characteristic. A spirally coiled spring generally indicated at 51 is attached at its inner end 52 to a hollow shaft 53 which is rotatably mouned on a concentric support axle 54 (FIG. 8), the arrangement being such that the center of the spring exactly coincides with the common axis of the shaft 53 and axle 54. As shown in FIGS. 7 and 10 the outer end of spring 51 is secured to housing 55 by fastening means 55a which may be adjustable if desired. At 56, a lever 57 is secured to the spring and embraces the latter by means of a folded portion 58. The point of attachment indicated at 56 is located so that the lever 57 subdivides the spring in a manner which will result in a desired expansion of the graduation in the lower range of measurements. The inner end 59 of lever 57 is rotatably supported on the axle 54, and the other end 60 of the lever projects freely from the spring in the zero position shown in solid lines in FIG. 7. When the hollow shaft 53 turns clockwise and thereby spring 51 is gradually wound up and tightened, lever 57 will be taken along by the spring and caused to turn until the lever has moved through the angle $\alpha$ shown in FIG. 7 and the end 60 thereof engages a stop or pin 61 fixed to housing 55. The size of the angle $\alpha$ through which the lever 57 moves from the zero position until engagement with stop 61, determines the position of the point at which a change in the characteristics of the spring takes place.

FIG. 9 is a diagram indicating the characteristics of the spring 51. The abscissas represent the winding angle $\varphi$ of the spring which is also the angle of rotation of shaft 53 or of a conventional pointer connected thereto while the ordinates show the corresponding restoring torque developed by the spring. Considering the inverted proportion obtained when dividing the angle of rotation of shaft 53 by the corresponding restoring torque, it will be apparent that line 62 extending from zero up to the point of change 64 indicates a figure higher than prevailing along line 63 behind the point of change 64, that is, the movement of a pointer resulting from a certain increase in the value to be measured will be larger in the range of line 62 than in the range of line 63. It is indicated in the diagram that when a pointer has turned from zero through half its stroke corresponding to a winding angle $\varphi_1$ performed at one effective spring length, only one third of the restoring torque has been developed. During the other half of the pointer stroke performed at another effective length of the spring, two thirds of the restoring torque are produced. The operation is as follows:

When a measurement is carried out, the hollow shaft 53 is caused to turn on the support axle 54 clockwise from the zero position through an angle related to the magnitude of the value to be determined. Shaft 53 may be actuated with the aid of eddy currents produced by the measuring apparatus. Initially, all windings of spring 51 are operative, that is, the entire potentially effective length of the spring is utilized. As the angle of rotation of shaft 53 increases and the conventional pointer which is normally connected thereto advances further, lever 57 approaches the stop 61 and finally engages the same. This will render the outer windings 51b extending from the fastening means 55a to the connecting point of lever 57 inoperative so that these windings will no longer participate in the development of restoring torque. Only the inner windings 51a extending from shaft 53 to the connecting point 56 will now be operative in the system and effective to influence the advance of the conventional pointer. Thus, the effective length of the spring has been reduced, that is, the relation of the torque produced by the measuring system, such as an eddy current system, to the restoring torque produced by the spring will be different; in othr words, the spring characteristics have been changed so that the spring constant is now larger, the constant being calculated by dividing the restoring torque by the angle of rotation of shaft 53 or of the conventional pointer connected thereto, the angle being equal to the winding angle of the spring.

It follows that in the total measuring range extending from zero to the maximum advance of the pointer, the spiral spring 51 has two constants. A smaller constant is effective in the lower range of measurements and a larger one in the consecutive higher range. To indicate a certain incremental change Δ in the magnitude of the value to be measured (such as speed of revolution), the angle of rotation of the pointer will be larger in the lower range of measurements (graph line 62) than in the higher range (graph line 63). Consequently, the graduation will be calibrated in the desired manner with the lower portion being expanded.

It will be understood that each of the elements described above, or two or more together, may also find a useful application in other types of apparatus differing from the types described above.

While the invention has been illustrated and described as embodied in a measuring instrument utilizing eddy currents, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a measuring system for determining values in consecutive ranges of magnitude, in combination, a resiliently flexible spiral spring which in response to the magnitude of said values to be determined is deformable through consecutive ranges of deflection coordinated to said ranges of magnitude of said values, said spring having characteristics depending upon the effective length thereof; and means radially fixed in position with reference to the axis of said spring for varying said effective length of said spring in accordance with the instant range of deflection thereof, whereby the instant characteristics of said spring are adaptable to the range of magnitude within which a respective value is measured.

2. In a measuring system for determining values in at least a first and a second range of magnitude, in combination, a resiliently flexible spiral spring which in response to the magnitude of said values to be determined is deformable through at least a first and a second range of deflection coordinated to said ranges of magnitude of said values, said spring having characteristics depending upon the effective length thereof; and means for automatically increasing said effective length of said spring when the deflection of said spring exceeds said first range of deflection thereof whereby the instant characteristics of said spring are adaptable to the range of magnitude within which a respective value is measured.

3. In an electrical measuring system operable with the aid of eddy currents which are related to values to be determined in at least a first and a second range of magnitude, in combination, a resiliently flexible spring which in response to the magnitude of said eddy currents is deformable through at least a first and a second range of deflection coordinated to the ranges of magnitude of said eddy currents and corresponding values to be determined, said spring having characteristics depending upon the effective length thereof; and means for increasing said effective length of said spring when said deflection of said spring exceeds said first range of deflection thereof, whereby the characteristics of said spring are adaptable to the range of magnitude within which a respective value is measured.

4. In a measuring system for determining values in different ranges of magnitude under different conditions, in combination, a resiliently flexible, spirally coiled torsion spring capable when flexed of developing torque proportional to the effective length thereof and arranged to be twisted through torsion angles related to the magnitude of said values to be determined, said torsion angles extending through different ranges coordinated to said ranges of magnitude of said values; and means for increasing said effective length of said spring when the torsion angle through which said spring is twisted exceeds a predetermined value, whereby the torque developed by said spring per unit of torsion angle is adaptable to the conditions in the instant range of magnitude within which the instant measurement is taken.

5. In a measuring apparatus for determining values in consecutive ranges of magnitude, in combination, a turnable member rotatable from a zero position through angles related to the magnitude of said values to be determined, said angles extending through consecutive ranges coordinated to said ranges of magnitude of said values; a resiliently flexible, spirally coiled torsion spring having a variable effective length, said spring being capable of exerting a restoring torque when deformed; connecting means for causing deflection of said spring in response to rotation of said turnable member with said restoring torque being developed in proportion to the instant angle of rotation of said turnable member and to said effective length of said spring; and abutment means arranged to maintain a fixed radial position with reference to the axis of said spring for varying said effective length of said spring upon a change in the range of the instant angle of rotation, whereby the restoring torque developed by said spring per unit of angular movement of said turnable member is adaptable to the instant range of magnitude within which a respective measurement is taken.

6. In an electrical measuring apparatus operable with the aid of eddy currents which are related to values to be determined in consecutive ranges of magnitude, in combination, a turnable member rotatable from a zero position through angles corresponding to the magnitude of said eddy currents; a resiliently flexible, spirally coiled spring having a variable effective length, said spring being capable of exerting a restoring torque when deformed through consecutive ranges of deflection coordinated to the ranges of magnitude of said eddy currents and corresponding values to be determined; connecting means for causing deflection of said spring in response to rotation of said turnable member with said restoring torque being developed in proportion to the instant angle of rotation of said turnable member and to said effective length of said spring; and abutment means arranged to maintain a fixed radial position with reference to the axis of said spring for varying said effective length of said spring upon a change in the range of deflection thereof, whereby the restoring torque developed by said spring per unit of angular movement of said turnable member is adaptable to the instant range of magnitude within which a respective measurement is taken.

7. In a measuring apparatus for determining values in consecutive ranges of magnitude, in combination, a turnable member rotatable from a zero position through angles related to the magnitude of said values to be determined, said angles extending through consecutive ranges coordinated to said ranges of magnitude of said values; a resiliently flexible, spirally coiled torsion spring having a variable effective length, said spring being capable of exerting a restoring torque when deformed; connecting means for causing deflection of said spring in response to rotation of said turnable member with said restoring torque being developed in proportion to the instant angle of rotation of said turnable member and to said effective length of said spring; and abutment means arranged to maintain a fixed radial position with reference to the axis of said spring for accurately varying said effective length of said spring upon a change in the range of the instant angle of rotation, said abutment means being adapted to act upon said spirally coiled spring in a direction substantially tangentially thereof so as to limit deflection of a portion of said spring in one direction.

8. In a measuring apparatus for determining values in consecutive ranges of magnitude, in combination, a housing; a turnable member mounted in said housing for rotation from a zero position through angles related to the magnitude of said values to be determined, said angles extending through consecutive ranges coordinated to said ranges of magnitude of said values; a resiliently flexible, spirally coiled torsion spring having a variable effective length, said spring being capable of exerting a restoring torque when deformed; fastening means for securing said spirally coiled spring to said housing in an area coordinated to the outer end of said spring; connecting means for causing deflection of said spring in response to rotation of said turnable member with said restoring torque being developed in proportion to the instant angle of rotation of said turnable member and to said effective length of said spring; and abutment means for varying said effective length of said spring upon a change in the range of the instant angle of rotation, said abutment means including an external projection on said spirally coiled spring and a stop mounted on said housing and engageable with said external projection of said spring, the relative angular position of said external projection and said stop being arranged in such a manner that, when said turnable member is in said zero position, said stop and said external projection engage each other and the portion of said spring extending from said fastening means to said projection is prestressed to a predetermined degree.

9. Apparatus as set forth in claim 8, in which said external projection on said spirally coiled spring is formed by an outwardly folded portion of said spring.

10. Apparatus as set forth in claim 8, in which said external projection on said spirally coiled spring is formed by a rider secured to said spring.

11. In a measuring apparatus for determining values in consecutive ranges of magnitude, in combination, a housing; a turnable member mounted in said housing for rotation from a zero position through angles related to the magnitude of said values to be determined, said angles extending through consecutive ranges coordinated to said ranges of magnitude of said values; a resiliently flexible, spirally coiled torsion spring having a variable effective length, said spring being capable of exerting a restoring torque when deformed; connecting means for causing deflection of said spring in response to rotation of said turnable member with said restoring torque being developed in proportion to the instant angle of rotation of said turnable member and to said effective length of said spring; and abutment means for varying said effective length of said spring upon a change in the range of the instant angle of rotation, said abutment means including a radially extending external projection on said spirally coiled spring and a stop adjustably mounted on said housing in the plane of said spring and engageable in said plane with said external projection of said spring.

12. In a measuring apparatus for determining values in consecutive ranges of magnitude, in combination, a housing; a turnable member mounted in said housing for rotation from a zero position through angles related to the magnitude of said values to be determined, said angles extending through consecutive ranges coordinated to said ranges of magnitude of said values; a resiliently flexible, spirally coiled torsion spring capable of exerting a restoring torque when deformed; fastening means for securing said spirally coiled spring to said housing in an area coordinated to the outer end of said spring; holding means for securing the inner end of said spirally coiled spring to said turnable member so as to cause deflection of said spring in response to rotation of said turnable member with said restoring torque being developed in proportion to the instant angle of rotation of said turnable member and to the effective length of said spring; said spring having a radially outwardly extending intermediate projection formed integrally therewith between said fastening means and holding means, and an outermost winding having a terminal extension projecting in cantilever manner from said fastening means and having its free end bent inwardly to form a stop engageable with said intermediate projection on said spring for varying said effective length thereof upon a change in the range of the instant angle of rotation, whereby the restoring torque developed by said spring per unit of angular movement of said turnable member is adaptable to the instant range of magnitude within which a respective measurement is taken.

13. In a measuring apparatus for determining values in consecutive ranges of magnitude, in combination, a housing; a turnable member mounted in said housing for rotation from a zero position through angles related to the magnitude of said values to be determined, said angles extending through consecutive ranges coordinated to said ranges of magnitude of said values; a resiliently flexible, spirally coiled torsion spring capable of exerting a restoring torque when deformed; fastening means for securing said spirally coiled spring to said housing in an area coordinated to the outer end of said spring; holding means for securing the inner end of said spirally coiled spring to said turnable member so as to cuase deflection of said spring in response to rotation of said turnable member with said restoring torque being developed in proportion to the instant angle of rotation of said turnable member and to the effective length of said spring; an intermediate projection positioned on said spirally coiled spring between said fastening means and holding means; and a stop mounted on said housing and engageable with said intermediate projection on said spring for varying said effective length thereof upon a change in the range of the instant angle of rotation, said fastening means being spaced from said stop by a relatively limited distance so that the portion of said spring extending from said fastening means to said intermediate projection of said spring will be prestressed to a predetermined degree when said stop and said intermediate projection on said spring engage each other and said turnable member is in its zero position.

14. In a measuring apparatus for determining values in consecutive ranges of magnitude, in combination, a housing; a turnable member mounted in said housing for rotation from a zero position through angles related to the magnitude of said values to be determined, said angles extending through consecutive ranges coordinated to said ranges of magnitude of said values; a resiliently flexible, spirally coiled torsion spring capable of exerting a restoring torque when deformed; fastening means for securing said spirally coiled spring to said housing in an area coordinated to the outer end of said spring; holding means for securing the inner end of said spirally coiled spring to said turnable member so as to cause deflection of said spring in response to rotation of said turnable member with said restoring torque being developed in proportion to the instant angle of rotation of said turnable member and to the effective length of said spring; an intermediate projection positioned on said spirally coiled spring between said fastening means and holding means, said intermediate projection defining a main effective spring portion in conjunction with said holding means and an auxiliary effective spring portion in conjunction with said fastening means; and a stop mounted on said housing and engageable with said intermediate projection on said spring for varying said effective length thereof upon a change in the range of the instant angle of rotation, said stop being located so that when said turnable member is in its zero position said stop engages said intermediate projection on said spring to render said auxiliary effective spring portion inoperative but when said turnable member has rotated through a predetermined angle and said spring has been deflected to a corresponding degree said intermediate projection on said spring will be disengaged from said stop to render said auxiliary effective spring portion operative and thereby increase the effective spring length, whereby said spring will initially be relatively stiff but will become softer upon disengagement of its projection from said stop.

15. In a measuring apparatus for determining values in consecutive ranges of magnitude, in combination, a housing; a turnable member mounted in said housing for rotation from a zero position through angles related to the magnitude of said values to be determined, said angles extending through consecutive ranges coordinated to said ranges of magnitude of said values; a resiliently flexible, spirally coiled torsion spring capable of exerting a restoring torque when deformed; fastening means for securing said spirally coiled spring to said housing in an area coordinated to the outer end of said spring; holding means for securing the inner end of said spirally coiled spring to said turnable member so as to cause deflection of said spring in response to rotation of said turnable member with said restoring torque being developed in proportion to the instant angle of rotation of said turnable member and to the effective length of said spring; and a projection on said spring formed by a lever pivotable about the axis of said turnable member and connected to said spring at a point intermediate said fastening means and holding means; and a stop mounted on said housing and engageable with said lever for varying said effective length of said spring upon a change in the range of the instant angle of rotation, whereby the restoring torque developed by said spring per unit of angular movement of said turnable member is adaptable to the instant range of magnitude within which a respective measurement is taken.

16. Apparatus as set forth in claim 15, wherein said pivotable lever is supported on said turnable member and freely turnable relative thereto.

17. In a measuring system for determining values in different ranges of magnitude under different conditions, in combination, a resilient spiral spring deflectable in response to the magnitude of said values to be determined, said spring having characteristics depending upon the effective length thereof; and means radially fixed in position with reference to the axis of said spring for increasing said effective length of said spring when said deflection of said spring exceeds a predetermined value whereby the characteristics of said spring are adaptable to said different conditions in said different ranges of magnitude.

References Cited by the Examiner

UNITED STATES PATENTS

| | | | |
|---|---|---|---|
| 568,046 | 9/1896 | Spratt | 73—519 |
| 1,073,443 | 9/1913 | Schurmann | 73—498 |
| 1,155,788 | 10/1915 | Blaine | 73—498 |

ORIS L. RADER, *Primary Examiner.*

DAVID X. SLINEY, *Examiner.*